United States Patent Office 3,709,852
Patented Jan. 9, 1973

3,709,852
ANTISTATIC THERMOPLASTIC MOULDING COMPOSITIONS
Wolfgang Gordon, Hofheim, Taunus, Hans-Jerg Kleiner, Bad Soden, Taunus, and Ulrich van Spankeren, Hofheim, Taunus, Germany, assignors to Farbwerke Hoechst Aktiengesellschaft vormals Meister Lucius & Brüning, Frankfurt am Main, Germany
No Drawing. Filed Mar. 9, 1971, Ser. No. 122,555
Claims priority, application Germany, Mar. 11, 1970, P 20 11 551.9
Int. Cl. C08f 15/00, 45/00
U.S. Cl. 260—88.2 S
6 Claims

ABSTRACT OF THE DISCLOSURE

Thermoplastic moulding compositions for the making of antistatic shaped articles are disclosed. Compounds of the formula

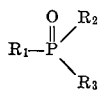

wherein $R_1$ is an alkyl radical of 8 to 24 carbon atoms and $R_2$ and $R_3$ are alkyl radicals of 1 to 3 carbon atoms, have proved to be especially efficient antistatic agents, particularly in view of their advantageous toxicological properties and of the fact that other favourable properties of the plastic materials, in which they are contained, are not adversely affected.

---

The present invention relates to antistatic thermoplastic moulding compositions.

Various processes are known to reduce the electrostatic charge on shaped articles, sheets and fibers made from plastic materials:

(1) It is possible to treat a shaped article after moulding with a solution or a dispersion of an antistatically effective and often slightly hygroscopic compound, which reduces the surface resistance. However, the effect is lost easily with articles for everyday use by wiping off this finish.

(2) It is also possible to oxidize, to a small extent, the shaped article made from plastic materials by means of strong oxidizers, such as sulfuric acid containing sulfuric anhydride, or chromosulfuric acid, and to subsequently react the acid groups having been formed at the surface with alcohols or amines. The antistatic finish thus effected cannot be removed mechanically, but the process is very complicated for mass-produced articles.

(3) Moreover, it is possible to incorporate substances into the shaped article made from plastic materials which reduce the electrostatic charge. There is known a great number of those substances, for example amines, alcohols, polyethylene glycol ethers, betaine compounds, amides or esters of carboxylic acids or aliphatic acids containing sulfur or phosphorus, or salts of these acids, besides heterocyclic compounds containing nitrogen, or compounds which contain the functional groups of the specified compounds in combination. Use has also been made of phosphoric acid amides which, however, are generally not very thermostable, and phosphoric acid esters which are not suitable for many application purposes, due to their high toxicity.

However, no compound has been found so far, which can be incorporated satisfactorily into thermoplastic materials, and, at the same time, develops a good antistatic effect in the polymer and does not show any adverse secondary effects.

Many of the known antistatically effective compounds are liquid or as soft as wax and are, therefore, unsuitable for admixture with powders. Other substances have only a short-time effect or the effect takes a long time to develop, or the substances are sufficiently effective only in concentrations of more than 1% by weight. Many compounds exude after some time, and form crystals or a greasy film on the surface of the shaped article. In most cases, the antistatic agent is degraded by the commonly applied processing temperatures of up to 300° C., which results in discolorations. Finally, the addition of the antistatic agents can also result in the reduction of the resistance to aging under heat of the thermoplastic materials, which becomes evident by discoloration or embrittlement on heating the shaped article for a longer period of time. Besides, the application of a great number of virtually efficient antistatic agents is limited by the fact that their toxicity is so high that the shaped articles or sheets finished therewith must not be brought into contact with food.

Now we have found that thermoplastic shaped articles having excellent antistatic properties are obtained by adding to the thermoplastic material as antistatic agent from 0.1 to 2% by weight, calculated on the thermoplastic material, of at least one phosphine oxide of the formula

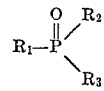

wherein $R_1$ represents an alkyl radical having from 8 to 24 carbon atoms, and $R_2$ and $R_3$ represent identical or different alkyl radicals having from 1 to 3 carbon atoms. Particularly efficient are those compounds in which $R_1$ contains from 10 to 18 carbon atoms and $R_2$ and $R_3$ are methyl groups. It is possible to use either a single phosphine oxide or a mixture of several phosphine oxides, in order to combine the short-time and the permanent effect. It is also possible to combine the specified phosphine oxides with other known antistatic agents.

The phosphine oxides mentioned have proved to be particularly suitable for the antistatic finish of polyolefins, such as high-pressure polyethylene, low-pressure polyethylene, polypropylene, and of copolymers of ethylene with propylene, butene, pentene, hexene, 4-methyl pentene and other α-olefins. A reduction of the electrostatic charge by an addition of phosphine oxides was also observed in polystyrene, styrene-butadiene-copolymers, acrylonitrile-butadiene-styrene polymers, polyesters, polyvinyl chloride, mixtures of polyvinyl chloride with chlorinated polyethylene, polymethacrylate, polyamides and in trioxane-ethylene oxide-copolymers. The antistatic thermoplastic moulding composition may contain further additives, such as stabilizers, lubricants, nucleating agents, plasticizers, fillers, color pigments or processing auxiliaries.

The amount of phosphine oxide required depends on the respective thermoplastic material and is generally in a range of from 0.1 to 2% by weight, calculated on the thermoplastic material, preferably between 0.3 and 1.0% by weight. A greater amount of antistatic material may as well be incorporated into the thermoplastic material, but the antistatic effect is only slightly improved in this case.

It is a special advantage of the specified phosphine oxides that they can be prepared by reacting an α-olefin with a dialkyl phosphine oxide, whereby the radical $R_1$ can be varied easily. This makes it possible to select, for every thermoplastic material, the optimum antistatic agent from this series of phosphine oxides by adjusting the radical $R_1$ and the concentrtion. It is also possible to optimize the chain length of $R_1$ and the concentration in such a way that the antistatic agent has both a short-time and a permanent effect. It is a further advantage that the surface resistance of the thermoplastic materials is practically not reduced by the presence of the small amounts of phosphine oxide and that the good insulator properties are not adversely affected.

All known processes may be applied for mixing the phosphine oxides with the thermoplastic materials. A special advantage of the phosphine oxides is, however, that—in contradistinction to most other known antistatic agents—they are not liquid or as soft as wax, but that they can be easily comminuted to give a voluminous powder. This makes it possible to admix the antistatic agent to the plastic moulding powder or granules in the form of a powder without the preparation of a master batch being necessary. From the mixtures thus obtained, shaped articles, sheets or fibers can be manufactured according to all common processes.

So far phosphine oxides have been known as detergents and as components for the preparation of synthetic washing powders. It is new and a surprising fact which could not have been foreseen that they impart antistatic properties to thermoplastic materials. The low concentrations which are sufficient for the antistatic finish of thermoplastic materials are remarkable.

The use of phosphine oxides as antistatic agents has a series of further advantages. Thus, for example, the minor tendency to exudation and the fact that this tendency can be influenced not only by the concentration, but also by the length of the radical $R_1$ in the manner described above, are advantageous.

A further most advantageous fact is that phosphine oxides are exceptionally stable. According to A. J. Kirby and G. S. Warren, "The Organic Chemistry of Phosphorus" (1951), page 151, the P—C bond is split up only at a temperature of 500° C. This makes it possible to process the thermoplastic materials at temperatures which are most suitable with regard to their properties, i.e. up to 300° C., without the plastic material being discolored and losing its good appearance by partial or total decomposition of the antistatic agent. This is why lower temperatures have to be applied in the case of many known antistatic substances, so that the optimum material values are not reached. In order to avoid the risk of discoloration by impurities, phosphine oxides are advantageously applied in pure state.

Another advantage—as has been found in combination with polyolefins—is that the resistance to aging under heat is not reduced by the incorporation of from 0.1 to 2% by weight of phosphine oxide.

Particularly advantageous are the toxicological properties of the phosphine oxides. The lethal dose of 50% of the examined rats with oral application is more than 1 gram per kilogram of body weight with the phosphine oxides tested, in which $R_2$ and $R_3$ represent $CH_3$. This value increases rapidly with the increasing length of radical $R_1$ and is more than 10 grams per kilogram of body weight already with tetradecyl dimethyl phosphine oxide. It is, therefore, particularly advantageous that thermoplastic materials which have been finished with such antistatic agents may also be brought into contact with food. The antistatic substances known in the art, which meet these requirements, have only a minor effect at such low concentrations.

It is well known that the electrostatic charge of shaped articles, sheets and fibers made from plastic materials involves a series of drawbacks. Thus, for example, dust is attracted, which results in the formation of ugly stains, crow's feet and zigzag patterns, or, in the case of fibers, leads to a more rapid accumulation of dirt. The static charge is also a drawback in the processing of plastic materials, since the mutual attraction of charged plastic material particles can result in sticking together, or, in the case of sheets, for example, in blocking. For these reasons the thermoplastic moulding compositions finished in accordance with the invention are very suitable for the manufacture of semi-finished articles, hollow articles, sheets and injection-moulded articles, for example, packaging materials in the form of canisters, bottles and jars for medicines, food, cosmetics and detergents, and also of shopping bags, textiles of ribbons or fibers, casings for vacuum cleaners and kitchen utensils, of buckets and bottle cases.

The advantages of the phosphine oxides are illustrated by the following examples:

EXAMPLE 1

Polyethylene powder (density 0.95; melt index $i_5$ (according to ASTM D 1238–52T) at 190° C.; 1.6 g./min.) was mixed with 0.7% by weight of dimethyl dodecyl phosphine oxide and granulated at 280° C. At a temperature of 280° C., flats of a thickness of 1 mm. were injection-moulded from the granules. After 2 days, one of the flats was rubbed ten times with a clean cotton cloth by means of an apparatus according to H. Koldewey (Kunststoff-Berater 1968, page 983). The voltage thus produced was —800 v. and could no more be detected after 15 minutes. With a blank sample without any antistatic agent, the same rubbing produced —4000 v. This charge was reduced to —3700 v. after 15 minutes under the same conditions (22° C., 40% air humidity). The surface resistance of the flat as well as of the blank sample was more than $1.10^{13} \Omega$.

Thirty days after injection moulding the rubbing test was repeated with another flat. The charge was —450 v. The half-life of the discharge was less than 1 minute.

After 30 days, no undesired film had been formed on the surface. The color of the flats was identical with that of the blank sample.

A flat was exposed to a temperature of 100° C. in a drying cabinet for 7 days. This treatment resulted in a slight yellow discoloration which was not stronger than with the blank sample.

EXAMPLE 2

According to the process specified in Example 1, flats of a thickness of 1 mm. were manufactured from polyethylene (density 0.965, $i_5$ at 190° C.: 18 g./10 min.) and 0.3% by weight of dimethyl hexadecyl phosphine oxide, which flats were rubbed ten times with a cotton cloth in the manner described in Example 1. The voltage thus produced was —600 v. When colorimetric tests were performed in accordance with W. Binder, Melliand Textilberichte, volume 38 (1957), page 1398 and volume 39 (1959), pp. 77 and 187, a yellow value of 8.6 and a brightness reference value of 47.7 were found. A blank sample showed the values of 8.3 and 47.2. After 30 days, no undesired film had been formed on the surface. The surface resistance of the flat as well as of the blank sample was more than $1.10^{13} \Omega$. A flat was exposed to a temperature of 100° C. in a drying cabinet for 7 days. The resulting slight yellow discoloration was not stronger than with the blank sample.

EXAMPLE 3

Analogous to Example 1, flats were manufactured from polypropylene ($i_5$ at 230° C.: 6 g./10 min.) and 1.0% by weight of diethyl dodecyl phosphine oxide, and after 2 days the frictional charge was measured according to Example 1. It was +360 v., as compared against —2600 v. of the blank sample without any antistatic agent. After 30 days, no undesired film had been formed on the surface. The surface resistance of the flat as well as of the blank sample was more than $1.10^{13} \Omega$. The color of the flats was identical with that of the blank sample. A flat was exposed to a temperature of 110° C. in a drying cabinet for 7 days. This treatment resulted in a slight yellow discoloration which was not stronger than with the blank sample.

EXAMPLE 4

Analogous to Example 1, flats were manufactured from a copolymer of propylene and ethylene (92:8) ($i_5$ at 230° C.: 16g./10 min.) and 1.0% by weight of dimethyl eicosyl phosphine oxide, and after 30 days a frictional charge of −350 v. was measured in the manner as described in Example 1. After 30 days, no undesired film had been formed on the surface. The surface resistance of the flat as well as of the blank sample was more than $1.10^{13}\Omega$. The color of the flats was identical to that of the blank sample. A flat was exposed to a temperature of 110° C. in a drying cabinet for 7 days. This treatment resulted in a slight yellow discoloration which was not stronger than with the blank sample.

EXAMPLES 5–9

Phosphine oxides in pulverulent form were powdered onto granules of several thermoplastic materials, or, in the case of PVC, rolled onto the material, and the mixtures obtained were injection-moulded into flats of a thickness of 1 mm. After 10 days these flats were rubbed with a cotton cloth and were exposed to a normal dusty atmosphere. The following table shows the dusting degree after a period of 4 weeks qualitatively in comparison with blank samples which had been manufactured and treated in a corresponding manner.

| Example | Thermoplastic material | Antistatic agent | Concentration, percent | Moulding temp., °C. | Dusting degree as compared with blank sample |
|---|---|---|---|---|---|
| 5 | Polystyrene | $C_{10}H_{21}$-PO($CH_3$)$_2$ | 0.5 | 220 | Minor |
| 6 | Polyethylene terephthalate | $C_{18}H_{37}$-PO($CH_3$)$_2$ | 0.7 | 260 | Do. |
| 7 | Poly-ε-caprolactam | $C_{14}H_{29}$-PO($CH_3$)$_2$ | 1.0 | 240 | None. |
| 8 | PVC | $C_{12}H_{25}$-PO($CH_3$)$_2$ | 1.0 | 170 | Slight. |
| 9 | Trioxane ethylene oxide copolymer (98:2) | $C_{12}H_{25}$-PO($CH_3$)$_2$ | 1.0 | 200 | Minor. |

EXAMPLE 10 (COMPARATIVE EXAMPLE)

Analogous to Example 1, flats were manufactured from polyethylene (density 0.965, $i_5$ at 190° C.: 18 g./10 min.) and 1.0% by weight of Atmos 150® (mono- and diglycerides of palmitic, stearic and oleic acid in a proportion of about 1:1), which has been admitted by the Food and Drug Administration; subsequently the frictional charge was measured. 2 days after injection moulding it was −1900 v., and 30 days after moulding it was −5500 v.

What is claimed is:

1. A thermoplastic moulding composition for the manufacture of antistatic shaped articles, containing as antistatic agent from 0.1 to 2% by weight, calculated on the thermoplastic material, of at least one phosphine oxide of the formula

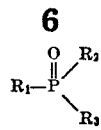

in which $R_1$ stands for an alkyl radical having from 8 to 24 carbon atoms, and $R_2$ and $R_3$ represent identical or different alkyl radicals having from 1 to 3 carbon atoms.

2. A thermoplastic moulding composition as claimed in claim 1, wherein the phosphine oxide is contained in a concentration of 0.3 to 1.0% by weight.

3. A thermoplastic moulding composition as claimed in claim 1, wherein one or several stabilizers, lubricants, nucleating agents, plasticizers, fillers, color pigments or processing auxiliaries are contained as further additives.

4. A thermoplastic moulding composition as claimed in claim 1, wherein the thermoplastic material is high-pressure polyethylene, low-pressure polyethylene, polypropylene or copolymers of ethylene and α-olefins.

5. A thermoplastic moulding composition as claimed in claim 1, containing a phosphine oxide in which $R_1$ represents an alkyl radical having from 10 to 18 carbon atoms, and $R_2$ and $R_3$ are methyl groups.

6. Shaped articles, sheets, fibers and antistatic commodities made thereof on the basis of the thermoplastic moulding compositions claimed in claim 1.

References Cited

UNITED STATES PATENTS

| | | | |
|---|---|---|---|
| 3,468,869 | 9/1969 | Sherburne | 260—94.9 |
| 3,565,810 | 2/1971 | Mausner et al. | 260—583 |
| 3,536,660 | 10/1970 | Tooker et al. | 260—45.7 |

FOREIGN PATENTS 976,974  12/1964  Great Britain.

JAMES A. SEIDLECK, Primary Examiner

E. J. SMITH, Assistant Examiner

U.S. Cl. X.R.

260—67 FP, 75, 78 S, 80.7, 85.1, 89.5 S, 92.8 A, 93.5 A, 93.7, 94.9 GD, 897 C, Digest 16